Dec. 2, 1930.  J. T. WORTHINGTON  1,783,595

DEHYDRATOR HAVING HORIZONTAL REVOLVING ELECTRODES

Filed Nov. 11, 1926

INVENTOR:
JOHN T. WORTHINGTON,
By Fad W. Davis
ATTORNEY.

Patented Dec. 2, 1930

1,783,595

UNITED STATES PATENT OFFICE

JOHN T. WORTHINGTON, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR HAVING HORIZONTAL REVOLVING ELECTRODES

Application filed November 11, 1926. Serial No. 147,737.

My invention relates to electrical dehydrators for removing the water from petroleum emulsions.

Petroleum as it occurs in nature sometimes carries particles of water which must be removed therefrom by a suitable dehydrating process in order for the petroleum to be commercially valuable. The removing of the water from petroleum is commonly accomplished by use of an electrical dehydrator having a pair of electrodes between which an electric field is established. The emulsion to be treated is passed through the electric field where the water particles are agglomerated so that they will separate from the petroleum.

It is an object of this invention to provide a dehydrator which will economically and efficiently agglomerate the water particles of the emulsion and in which short-circuiting of the water particles between the electrodes is prevented.

Another object of the invention is to provide a dehydrator having a pair of cylindrical electrodes, one mounted within the other and one being rotatable.

Other objects and advantages of the invention will be made evident hereinafter.

Referring to the drawing in which I illustrate one form of the invention,

Figure 1:
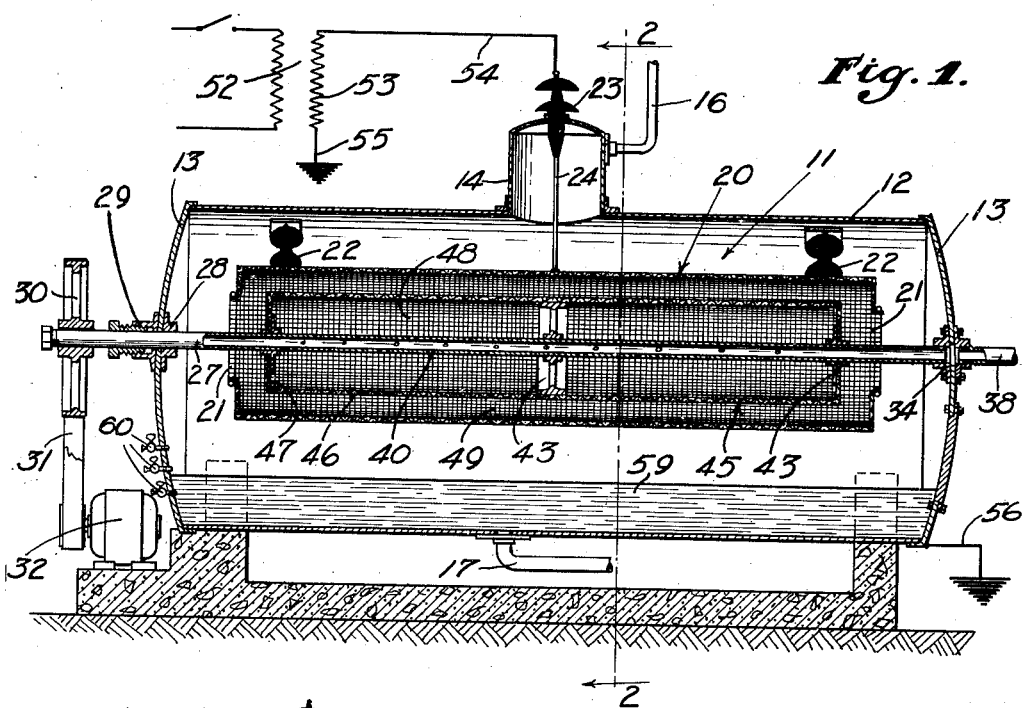
Fig. 1 is a vertical cross section taken through the preferred embodiment of the invention.
Figure 2:
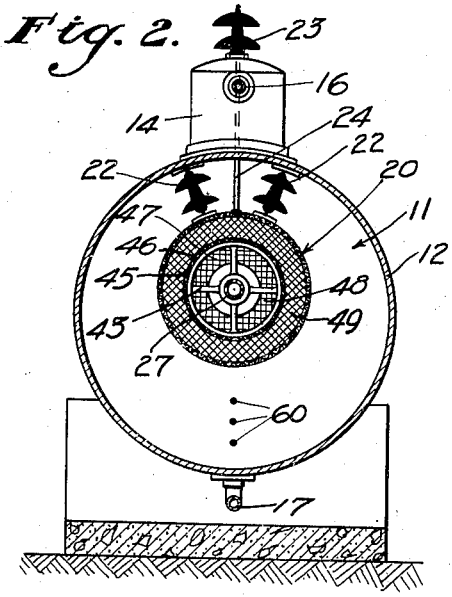
Fig. 2 is a section taken on the line 2—2 of Fig. 1.

Referring to the drawing in detail I provide a tank 11 which consists of a cylindrical shell 12 and heads 13 which are secured to the ends of the shell 12. A dome 14 is provided at the upper part of the tank 11 to which dome an oil outlet pipe 16 is connected. Connected to the lower part of the tank 11 is a water drain pipe 17.

Supported in the tank is an outer live interstitial drum electrode 20. The live electrode 20 is preferably formed from a screen, such as shown, which has a multiplicity of interstices. The live electrode 20 is disposed on a horizontal axis and has openings 21 formed at the opposite ends thereof. Insulators 22 attached to the upper part of the live electrode 20 and to the upper part of the tank 11 are provided for the purpose of supporting this electrode in the position shown. An inlet bushing 23 formed of insulation material is extended to the interior of the tank 11 through the dome 14. The inlet bushing 23 carries a conductor rod 24 which is attached to the live electrode 20.

Extended into the tank 11 is a horizontal spray pipe 27. This spray pipe 27 is extended concentrically through the live electrode 20. The left end of the spray pipe 27 is supported by a bearing 28 and extends to the outside of the tank 11 through a stuffing box 29. The outer end of the spray pipe 27 is provided with a pulley 30. The pulley 30 is driven by means of a belt 31 which is operated by a motor 32.

Figure 3:
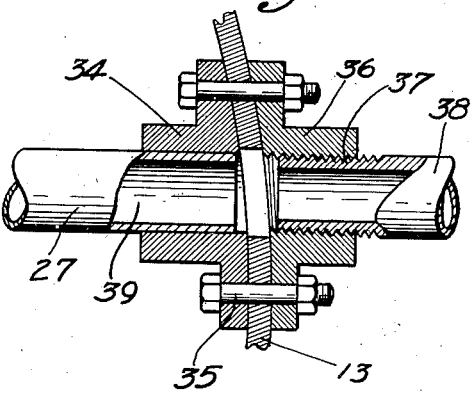
Fig. 3 is an enlarged detail of a bearing of the invention.

The right end of the spray pipe 27 is supported in a bearing bracket 34. This bearing bracket is shown in detail in Fig. 3. The bearing bracket 34 is attached to the inner face of the right head 13 by bolts 35. The right end of the spray pipe 27 does not extend from the tank 11. Attached to the outside of the head 13 adjacent to and in alignment with the bearing bracket 34 is a flanged union 36 in which an end 37 of an emulsion inlet pipe 38 is threadedly secured. The spray pipe 27 has an opening 39 which is in communication with the emulsion inlet 38 and is provided with spray openings 40 through which the emulsion passes into the tank 11.

Attached to the spray pipe 27 inside the live electrode 20 are spiders 43 which support an inner grounded interstitial drum electrode 45. This grounded electrode 45 is preferably formed from screen and has a multiplicity of interstices. The grounded electrode 45 has a cylindrical wall 46 and end walls 47 which provide a completely closed inner space 48. An annular treating space 49 is formed between the inner grounded electrode 45 and the outer live electrode 20.

The grounded and live electrodes are connected in a high tension circuit so that an electric field is established in the treating space 49. Referring to Fig. 1, there is shown diagrammatically a transformer 52 having a secondary 53. One side of the transformer 53 is connected by a wire 54 to the conductor 24, whereas the other side of the secondary 53 is grounded as indicated at 55. The tank 11 is likewise grounded as indicated at 56. The inner electrode 45 being connected to the tank 11 is therefore grounded.

In operating the invention the motor 32 is energized so that the spray pipe 27 is rotated at a slow rate of speed. Emulsion to be treated is passed through the emulsion inlet pipe 38 and through the passage 39 of the spray pipe 27. This emulsion passes through the openings 40 into the space 48 inside the grounded electrode 45. The emulsion passes outward through the interstices of the grounded electrode 45 into the treating space 49 where an electric field has previously been established by completing the electric circuit in which the electrodes are included. The water particles of the emulsion are treated by the electric field and are agglomerated so that they are of sufficient size to gravitate from the oil. The treated emulsion which consists of dry oil and large water particles is forced through the interstices of the live electrode 20 into the surrounding space in the tank 11.

It should be noted that the live electrode 20 is placed between the grounded electrode 45 and the tank 11. There will be, therefore, an electric field established between the live electrode 20 and the tank 11 as well as between the live and grounded electrodes; however, the electric field between the live electrode and the tank will be weaker than that between the two electrodes.

When the emulsion passes into the space of the tank surrounding the live electrode 20 the water masses gravitate to the lower part of the tank, whereas the dry oil rises upward into the dome 14 and is withdrawn therefrom by the oil outlet pipe 16. The water particles form into a body as indicated at 59 in the lower part of the tank 11. This water is periodically removed from the tank through the water drain pipe 17. For the purpose of determining the size of the body of water 59 I provide try-cocks 60 which are placed at different levels and which may be opened momentarily for determining the water level in the tank.

The important part of the invention consists, first, in the cylindrical interstitial drum electrodes which are placed on a horizontal axis. Another feature of the invention is that one of the drums is rotated to prevent short-circuiting of water particles in the treating space 49. A further feature is that all of the emulsion is caused to pass through the treating space 49.

I claim as my invention:

1. In a dehydrator, the combination of: a tank; a primary drum electrode in said tank; a secondary drum electrode within said primary drum electrode, there being a treating space between the primary and secondary drums; means for rotatably supporting one of said drum electrodes; means for rotating the rotatably supported electrode; and a spray pipe extending into said rotatable electrode for introducing emulsion into said treating space.

2. In a dehydrator, the combination of: a tank having fluid outlet means; an outer drum electrode; means for supporting said drum in said tank; an inner drum electrode within said outer drum electrode, there being a treating space between said outer and inner drum electrodes; a spray pipe extended into said tank and inside said inner drum electrode; supporting means for supporting said inner drum electrode from said spray pipe; means for rotating said spray pipe, said inner drum electrode rotating therewith; an emulsion pipe for supplying emulsion to said spray pipe, said emulsion passing from said spray pipe into said treating space; and means for connecting said inner and outer drum electrodes in an electrical circuit.

3. In a dehydrator, the combination of: a tank having fluid outlet means; an outer interstitial drum electrode; means for supporting said drum in said tank; an inner interstitial drum electrode within said outer interstitial drum electrode, there being a treating space between said outer and inner interstitial drum electrodes; a spray pipe extended into said tank and inside said inner interstitial drum electrode; supporting means for supporting said inner interstitial drum electrode from said spray pipe; means for rotating said spray pipe, said inner interstitial drum electrode rotating therewith; an emulsion pipe for supplying emulsion to said spray pipe, said emulsion passing from said spray pipe into said treating space, said emulsion passing into said treating space through interstices in said inner interstitial drum electrode and from said treating space through interstices of said outer interstitial drum electrode; and means for connecting said inner and outer interstitial drum electrodes in an electrical circuit.

4. In a dehydrator, the combination of: a tank having fluid outlet means; a horizontal outer drum electrode; means for supporting said drum in said tank; a horizontal inner drum electrode within said outer drum electrode, there being a treating space between said outer and inner drum electrodes; a horizontal spray pipe extended into said tank and inside said inner drum electrode; supporting means for supporting said inner drum electrode from said spray pipe; means for rotating said horizontal spray pipe, said inner drum electrode rotating therewith; an emulsion pipe for supplying emulsion to said spray pipe, said emulsion passing from said spray pipe into said treating space; and means for connecting said inner and outer drum electrodes in an electrical circuit.

5. In a dehydrator, the combination of: a tank having fluid outlet means; a horizontal outer interstitial drum electrode; means for supporting said drum in said tank; a horizontal inner interstitial drum electrode within said outer interstitial drum electrode, there being a treating space between said outer and inner interstitial drum electrodes; a horizontal spray pipe extended into said tank and inside said inner interstitial drum electrode; supporting means for supporting said inner interstitial drum electrode from said spray pipe; means for rotating said horizontal spray pipe, said inner interstitial drum electrode rotating therewith; an emulsion pipe for supplying emulsion to said spray pipe, said emulsion passing from said spray pipe into said treating space, said emulsion passing into said treating space through interstices in said inner interstitial drum electrode and from said treating space through interstices of said outer interstitial drum electrode; and means for connecting said inner and outer interstitial drum electrodes in an electrical circuit.

6. A combination as defined in claim 1 in which said primary and secondary drum electrodes are formed of screen.

7. In a dehydrator, the combination of: a tank; a primary drum electrode in said tank; a secondary drum electrode within said primary drum electrode, there being a treating space between the primary and secondary drums; and means for rotatably supporting one of said drum electrodes, said means supplying to said treating space a fluid to be treated.

8. In a dehydrator, the combination of; a tank; a primary drum electrode in said tank; a secondary drum electrode within said primary drum electrode, there being a treating space between said drum electrodes; a spray pipe journalled in said tank and supporting one of said electrodes; and a pipe in communication with said spray pipe for conducting a fluid to be treated thereto, said fluid passing through said spray pipe and into said treating space.

9. In a dehydrator, the combination of: a tank; a horizontal outer screen electrode in said tank and forming a substantially closed space except for end openings therein; a pipe extending through said end openings; a horizontal inner screen electrode secured to said tank and defining a closed central space; and means for supplying a fluid to be treated to said pipe, said fluid entering said closed central space and passing through said inner screen electrode and through a treating space between said inner and outer electrodes.

10. In a dehydrator, the combination of: an outer drum electrode; an inner perforated drum electrode, said inner electrode defining a central space; means for setting up a field between said electrodes; means for rotating said inner electrode; and means for introducing emulsion into said central space, said emulsion passing outward through the perforations of said inner electrode and into said electric field.

11. In a dehydrator, the combination of: a pair of electrodes between which is established an electric field; and means for passing a fluid to be treated through both of said electrodes and through substantially the shortest path existing between said electrodes in said electric field.

12. In a dehydrator, the combination of: a tank; a primary interstitial electrode; a secondary interstitial electrode defining a central space; means for introducing the fluid to be treated into said central space, said fluid passing through said secondary interstitial electrode into a treating space defined between said electrodes; and means for establishing an electric field between said electrodes.

13. In a dehydrator, the combination of: a primary electrode; a secondary interstitial electrode defining a central space and communicating directly with a treating space formed between said electrodes through the interstices of said secondary electrode; means electrically connected to said secondary electrode for introducing the fluid to be treated into said central space; and means for establishing a difference in potential between said electrodes.

In testimony whereof, I have hereunto set my hand at Long Beach, California, this 5th day of November, 1926.

JOHN T. WORTHINGTON.